United States Patent [19]

Patti et al.

[11] Patent Number: 4,986,590
[45] Date of Patent: Jan. 22, 1991

[54] TRUCK BED LINER

[75] Inventors: Anthony G. Patti, San Gabriel; Larry L. DeHart, Sr., Placentia; Larry L. DeHart, Jr., Walnut, all of Calif.

[73] Assignee: All Tech Industries, Brea, Calif.

[21] Appl. No.: 340,918

[22] Filed: Apr. 20, 1989

[51] Int. Cl.⁵ .................................................. B62D 33/00
[52] U.S. Cl. .................................. 296/39.2; 220/403; 105/423
[58] Field of Search .............. 296/39.2; 220/403, 470, 220/400; 105/423

[56] References Cited

U.S. PATENT DOCUMENTS

| | | | |
|---|---|---|---|
| 1,259,320 | 3/1918 | Tyler | 296/39.1 |
| 1,527,080 | 2/1925 | Ringel | 105/423 |
| 2,912,137 | 11/1959 | Taylor | 296/39.2 |
| 3,881,768 | 5/1975 | Nix | 296/39.2 |
| 4,279,439 | 7/1981 | Cantieri | 296/39.2 |
| 4,505,508 | 3/1985 | Carter et al. | 296/39.2 |
| 4,752,097 | 6/1988 | Van Kirk et al. | 296/39.2 |
| 4,763,945 | 8/1988 | Murray | 296/39.2 |
| 4,765,671 | 8/1988 | Allen | 296/39.2 |
| 4,802,705 | 2/1989 | Elwell | 296/39.2 |
| 4,890,874 | 1/1990 | Davis | 296/39.2 |

Primary Examiner—Robert R. Song
Attorney, Agent, or Firm—Price, Gess & Ubell

[57] ABSTRACT

An inexpensive, easy to manipulate and assemble truck bed liner is made of a lightweight material such as waxed corrugated board. The liner may have two side panels, a first panel, and a one piece floor and tailgate panel. The panels are foldable and adjustable in size to accommodate various length truck beds. The panels are connected together at tabbed areas. The liner is attached to the bed with adhesive hook fasteners. The tailgate panel is fastened to the truck to allow sliding movement of the tailgate panel during opening and closing of the truck tailgate.

20 Claims, 3 Drawing Sheets

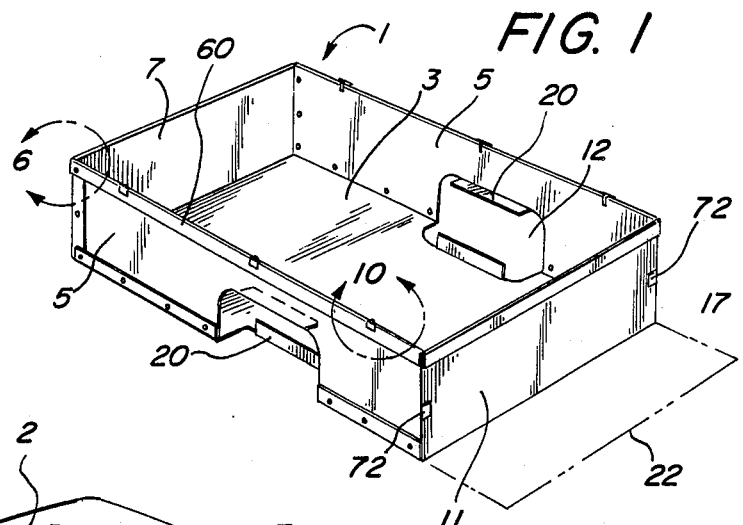
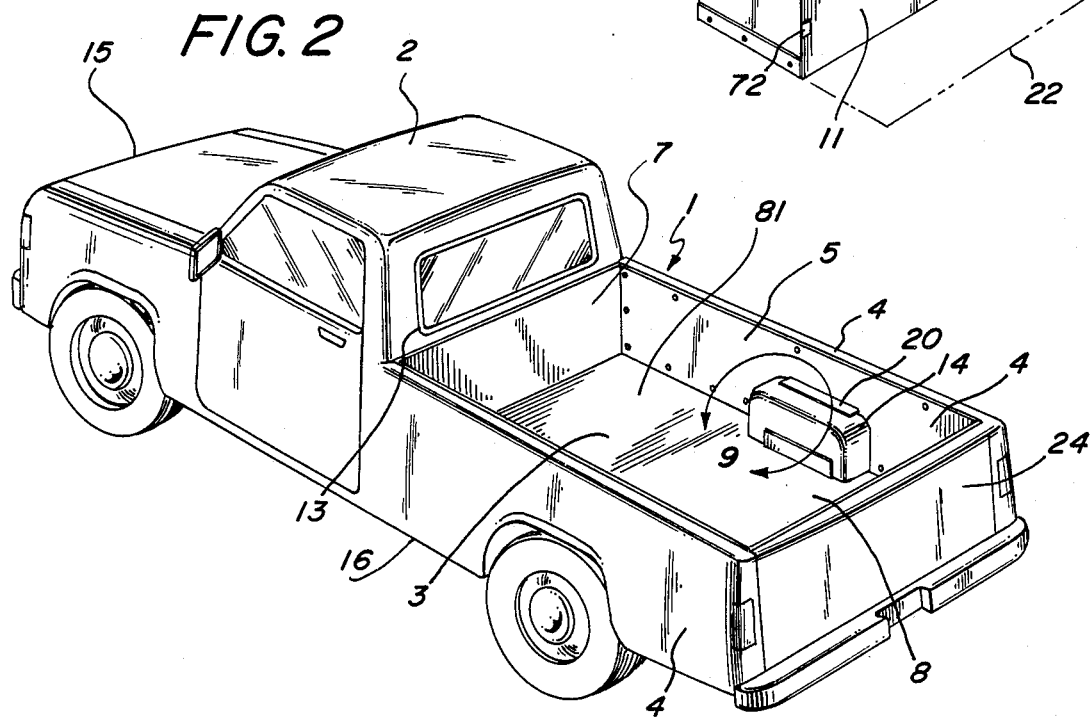
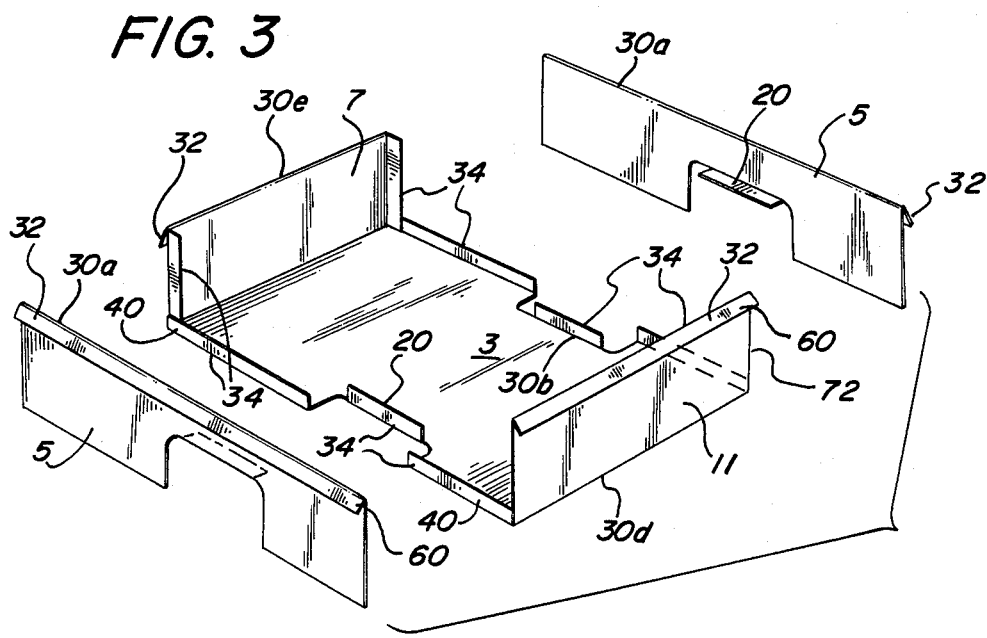

TRUCK BED LINER

BACKGROUND OF THE INVENTION

The present invention relates to a protective liner assembly and kit for the bed of a pick-up truck and more particularly concerns such an assembly and kit that is easily assembled and installed.

A variety of protective liners for truck beds have been suggested, including arrangements shown in the U.S. patents to Nix (U.S. Pat. No. 3,881,768), Carter, et al. (U.S. Pat. No. 4,505,508), and Van Kirk, et al. (U.S. Pat. No. 4,752,097). These arrangements shown in the prior art generally involve high degrees of complex fabrication, or are of one-piece, rigid construction.

Presently, the user of a truck bed liner, particularly the occasional or temporary user, is compelled to purchase one of these aforementioned expensive, difficult to assemble and manipulate liners. Such requirements of the occasional user produce a need for an inexpensive, portable and storable, easy to assemble and manipulate truck bed liner.

Accordingly, it is an object of the present invention to provide an improved truck bed liner assembly that avoids or minimizes the above-mentioned problems, with emphasis on the use of inexpensive, lightweight, yet sturdy materials, providing ease and simplicity of assembly and manipulation with a minimal amount of time and effort

SUMMARY OF THE INVENTION

The present invention provides protection for the inside of a pick-up truck bed with an inexpensive, easy to manipulate and assemble truck bed liner, comprised of two side panels, a front panel, a one piece floor and tailgate panel. The panels are manufactured of a lightweight, easy to manipulate material such as waxed corrugated board, comprising foldable areas allowing for ease of storage and portability, and adjustability in size to accommodate a variety of lengths of pick-up truck beds. The individual panel components are connected at overlapping tabbed areas, such areas configured to accommodate a male-female type connecting device. The unitary liner is attached to the truck bed with a series of adhesive hook fasteners, comprising a hook portion fastened over the edge of the liner and an adhesive portion adhering to the truck bed. The fastener is also used to allow for sliding movement of the tailgate panel on the truck bed tailgate during opening and closing, by fastening the hooked portion over the vertical edges of the tailgate panel, with the adhesive portion adhering to the tailgate.

DESCRIPTION OF THE DRAWING

FIG. 1 is a perspective view of the assembled truck bed liner of the instant invention.

FIG. 2 is a perspective view of the liner of FIG. 1 with a pick-up truck bed.

FIG. 3 is an exploded perspective view of one embodiment of the individual components of the liner in a folded configuration.

DETAILED DESCRIPTION OF THE PREFERRED EMBODIMENT

Figure 4:
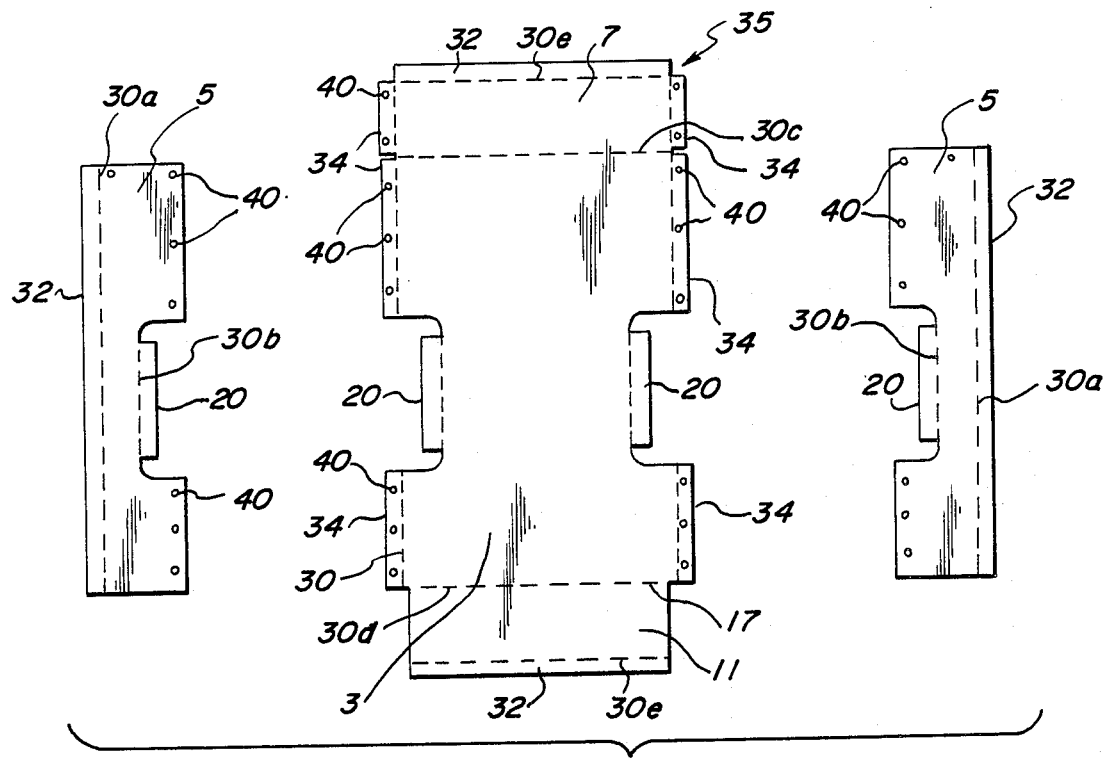
FIG. 4 is an exploded, plan view of the components of FIG. 3 unfolded.

The preferred embodiment herein described is not intended to be exhaustive or to limit the invention to the precise form disclosed. It is chosen and described to explain the principles of the invention and its application and practical use to enable others skilled in the art to utilize the invention.

Referring to FIG. 2, there is shown a pick-up truck 15 having a front cab 2 and a truck bed 16. The truck bed 16 includes upstanding side walls 4, front wall 13, floor 81 and tailgate 24 which define a storage compartment 8. Depicted within the storage compartment 8 is the truck bed liner 1 of the invention.

FIG. 4 depicts the unassembled individual components of the truck bed liner 1, comprising two side panels 5 and a main body panel 35. The main body panel 35 provides protection for the front wall 13, floor 81 and tailgate of the storage compartment 8, and comprises a unified floor panel 3, front panel 7 and tailgate panel 11. The floor 3 and side panels 5 have cutout portions 12 sized to fit around the wheel wells 14 of the pick-up truck bed 16 when positioned within the pick-up truck bed 16. However, an alternative embodiment of the instant invention comprises floor 3 and side panels 5 which are not cut-out, but are foldable or cuttable around the wheel wells 14.

FIG. 3 shows the individual flat panels of FIG. 4 folded at score lines 30 in preparation for connection and assembly. The side panels 5 are folded along the score lines 30a along the top edge of the panel to produce flap 32 which reinforces the upper edges of the side panel. Side panel 5 is also folded at score lines 30b to provide the tabs 20 for attachment to wheel well 14 of the pick-up bed 16. The main body panel is folded at score line 30c, providing a horizontal floor panel 3 and a vertical front panel 7 and at score line 30d to provide a vertical tailgate panel 11. Alternatively, the tailgate panel 11 may be manufactured separately from the floor panel 3, and separately attached to the floor panel 3 at assembly. The upper edges of the tailgate 11 and front panels 7 are also folded along score lines 30e, producing reinforcing edges or flaps 32 along the top of the panels.

Figure 10:
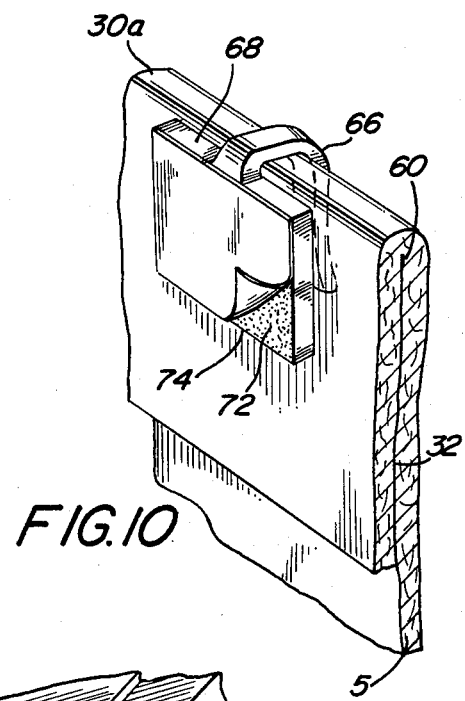
FIG. 10 is a cross-sectional, perspective view of an upper edge of the liner assembly with a device for fastening the liner assembly to the truck bed.

Referring to FIG. 10, the upper edges 32 of the front 7, tailgate 11 and side panels 5 are folded downwardly at score lines 30a and 30e to form a reinforcing edge portion 60 around the top edge of the liner 1, the edge portion 60 having an inverted U-shape. The amount of fold-over is sufficient to reinforce the edges 32, preferably about 2 to 3 inches. Alternatively, the liner edges folded or unfolded may be reinforced by the use of plastic or metal U-shaped channels which are configured to fit over the upper edges to extend the life of the liner.

Panel overlap tabs 34 are formed on the front and floor panels, by folding said panels at score lines 30. These panel overlap tabs 34 are areas of connection at which the side panels 5 will be connected to the main body panel 35 at the floor 3 and front panels 7. The panel overlap tabs 34 preferably have preformed holes 40, or, alternatively, perforated or marked areas which delineate the areas through which a fastener 50 may be placed through the side panels 5 and panel overlap tabs 34, to connect the component panels 3, 5 and 7 together to produce the unitary liner 1.

Figure 9:
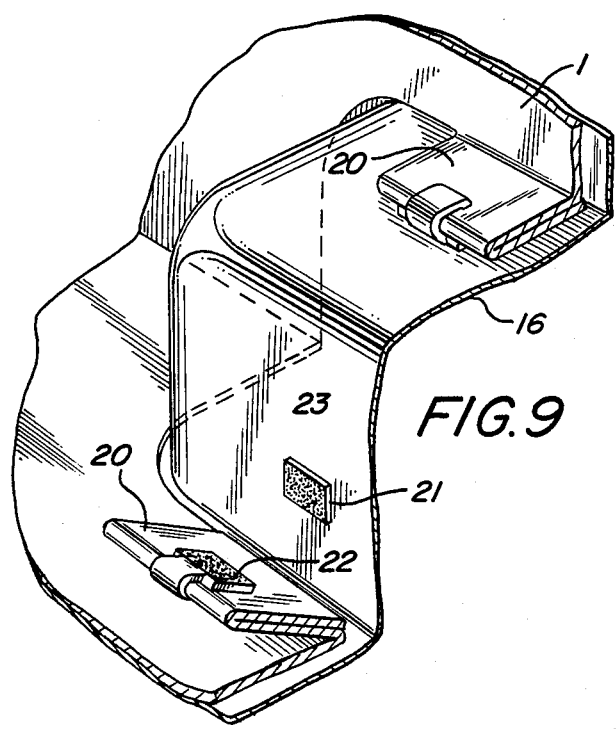
FIG. 9 is a perspective, cut-away view illustrating the truck bed liner with the truck bed wheel well.

Referring to FIG. 9, wheel well connector tabs 20, integral with the floor and side panels, extend into the wheel well cutout portions 12, providing areas of attachment between the liner 1 and the pick-up truck bed 16 at the wheel well 14. Attachment of the liner 1 at these areas secure the liner 1 to the truck bed 16, and advantageously lessen the effect of a rough ride or wind turbulence on the attachment of the liner 1 to the truck bed 16.

The panel components of the liner are preferably manufactured of materials such as heavy paper; fibrous paper products such as cardboard; fabrics such as canvas, cotton, or other woven or non-woven natural or synthetic fiber fabrics; resinous plastic films or sheets formed from various thermoplastic materials such as vinyl resins such as polyvinyl acetate; polyvinyl halides, such as polyvinyl chloride; various copolymers, e.g, polyvinyl chloridepolyvinyl acetate; and the like, as well as coated fabrics, rubber sheeting and the like, the choice of materials dictated by the specific nature of the material to be stored or carried within the truck bed. For instance, relatively light-weight, durable paper products for the liner 1 can be used for the transport of dry, nonchemical materials, whereas polymeric substances may be practicable for use with wet or chemical materials.

Preferably, the panels 3, 5, 7, and 11 are comprised of waxed corrugated board having a thickness and strength adequate to allow the liner 1 to provide the proper protective function for the truck bed 16. Preferably the board is between 0.062 and 0.250 inches in thickness, with a test weight of about 50 pounds. Additionally, the panels are preferably coated with a waterproofing or repelling substance such as wax to provide protection from the elements and increase the life and durability of the liner.

Figure 8:
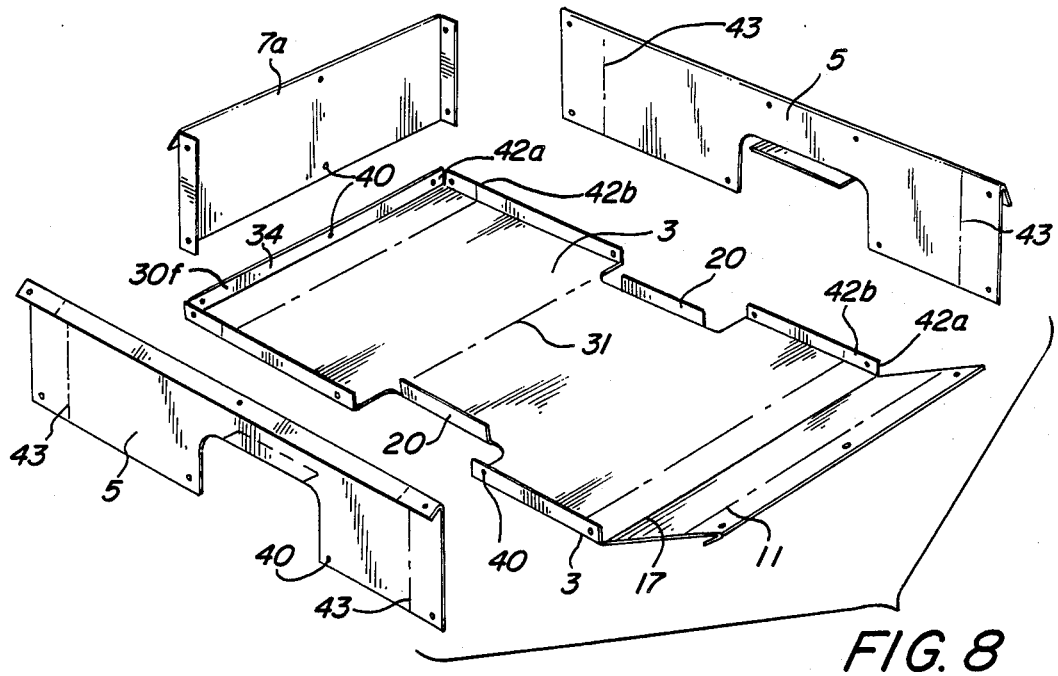
FIG. 8 is an exploded, perspective view of another embodiment of the components of the truck bed liner in a folded configuration, wherein the front panel is separate from the floor panel.

The panels are preferably supplied unassembled, so that they may be easily shipped. This is practiced since the panels can be readily assembled at the truck bed 16 location, and installed with a minimum of time and effort. This also provides for convenient handling and storage of the unassembled liner. The liner components are preferably foldable into a size and shape when packaged to be storable within an area of the truck itself, and to be readily available when required by the user. Referring to FIG. 8, the longer side 5 and floor 3 panels may have associated with them package score lines, one of which is shown at 31, allowing the panels 3, 5 to be folded at manufacture into a packaging along with the shorter panels 7 and 11.

Individual pick-up truck models presently have a variety of bed versions, typically known as short-beds or standard beds, wherein the truck bed 16 length is shorter than the long-bed model. In the short bed configuration, the truck bed 16 does not extend the full length of the pre-formed side 5 and floor 3 panels configured for use in a long-bed truck. The liner 1, as depicted in FIG. 4, is adapted for use with trucks manufactured on long-beds, wherein the side 5 and floor 3 panel area of the main body panel 35 of the liner 1 extend the full length of the truck bed 16.

Figure 5:
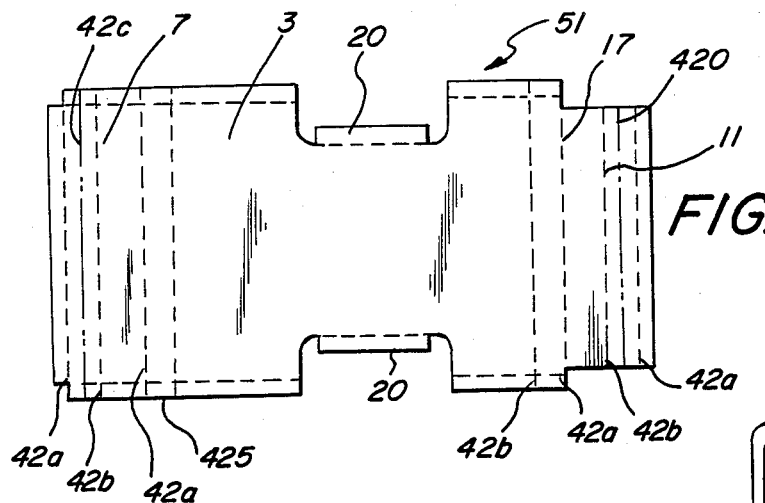
FIG. 5 is a plan view of a unitary front, lower and tailgate panel, having fold lines providing for adjustability in length.

Referring to FIG. 5, an embodiment of the main body panel 35 of FIG. 4 is depicted with score lines 42 to provide an adjustable main body panel 51. More specifically the adjustable panel 51 has a plurality of spaced, parallel score lines 42a, 42b and 42c which extend horizontally across the panels. Folding the panel 51 at score lines 42a during assembly provides the proper length floor panel 3 of panel 51 to fit a long-bed version of the truck bed 16; whereas folding the panel 51 at score lines 42b during assembly, and cutting the panel 51 at score lines 42c, adjusts the floor panel 3 to fit a short-bed version of the truck bed, and trims the front panel 7 and tailgate panel 11 to the proper height. Referring to FIG. 8, corresponding score lines 43 are found on the side panels 5. The folding or cutting of the side panels 5 at score lines 43 provides the proper length side panel to fit the short-bed version of the truck bed 16.

FIG. 8 represents an alternative embodiment of the present invention, wherein the floor panel 3 and tailgate panel 11 are unitary, and the front panel 7a is separate. Alternatively, the floor panel 3 and front panel 7a may be unitary, with the tailgate panel separate. Also, the front panel 7a, floor panel 3 and tailgate panel 11 may all be separate, with the panels connected together to produce a unitary liner. In each of these alternative embodiments, the panels may preferably be connected together by the use of panel overlap tabs 34 and connecting devices 50. When the floor and front panels are separate, an additional score line 30f is provided on the floor panel 3, the folding of which produces a panel overlap tab 34 which provides an area of attachment between the separate front panel 7a and the floor panel 3. Holes 40 are provided in both the panel overlap tab 34 of the floor panel 3 and the front panel 7a, which align and allow the passage of a connector 50 to unify the panels.

It is contemplated that the front panel 7 in its separate or unified state with the floor panel 3 may have associated with it art work, advertising or the like, providing promotional or display opportunities for the user and/or manufacturers or retailers of the present invention.

FIG. 1 represents the assembled truck bed liner 1, consisting of a floor panel 3, two side panels 5, front panel 7 and tailgate panel 11. The tailgate panel 11, as indicated by the phantom line 22 in FIG. 1, is constructed as to be unitary with the floor panel 3, yet is foldable along its association with the floor panel 3 as to allow for the opening and closing of the truck tailgate 24 when the tailgate panel 11 of the liner 1 is affixed to the tailgate 24 of the truck bed 16.

Figure 7:
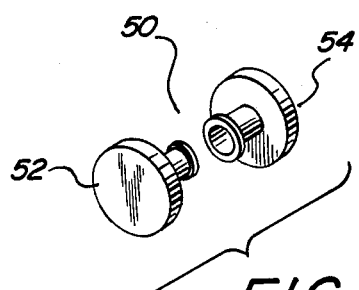
FIG. 7 is an exploded, perspective view of the connecting device of FIG. 6.
Figure 6:
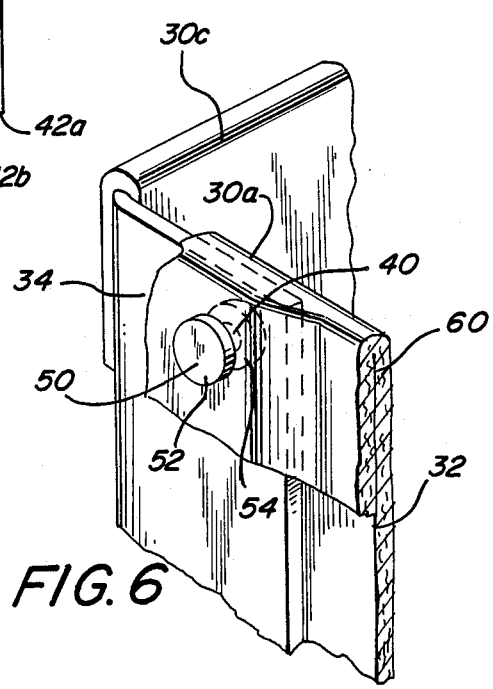
FIG. 6 is a perspective, partially cut-away view of a corner connection of side and front liner panels.

The panels 3, 5, 7, 11 may be fastened together in any conventional manner, such as by taping or gluing; or, by the use of conventional fasteners or connectors, such as rivets or staples. Preferably, the panels are fastened together by a male-female snap connector 50 as depicted in FIG. 7. The connector 50 has two sections, each comprising a base flange portion and a stem portion, with one stem portion securely fittable into the other stem portion. Referring to FIG. 6, the male portion 52 passes through the panel holes 40 at panel overlap tabs 34, and between reinforcing edge portion 60.

The holes 40 are preformed into the panels for the proper alignment of the panels. After passing through a hole 40, the male portion 52 attaches into the female portion 54, with the base flange portions abutting the panel material around the holes 40 to secure the panels together as depicted in FIG. 6.

The reinforcing edge portions 60 may be secured as depicted in FIG. 10, with a plurality of adhesive fasteners 64, located around the edges 32 of the liner 1, functioning to attach the liner 1 to the truck bed 16 along the edge portion 60 of the front and side panels. The fasteners 64 comprise a hook portion 66 formed integrally with a rectangular base 68 preferably manufactured of resilient, sturdy plastic material, such as polyvinylchloride. An adhesive layer 72 is applied to the base 68 and covered by a backing strip 74. After the strip 74 is removed, the adhesive layer 72 is pressed against the inner wall of the truck bed 16, with the hook portion 66 securely fitted over the edge portion 60 of the liner 1. The placement of the hook portion 66 over the upper edge 32 of the liner 1 holds the reinforcing overlapping of the edge portion 60 in place and produces a secure attachment between the liner 1 and the truck bed 16 by use of the adhesive layer 72.

Figure 11:
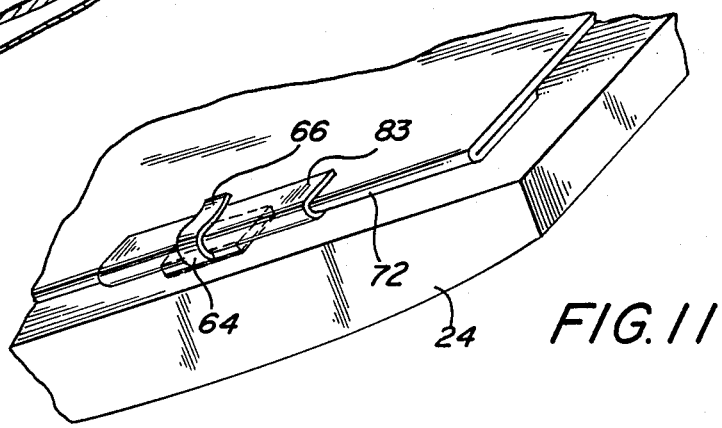
FIG. 11 is a perspective cut-away view of the attachment between the tailgate panel and the truck bed tailgate.

As depicted in FIG. 11, the tailgate panel 11 of the liner 1 has an adhesive hook 64 attached to it to facilitate the opening and closing of the tailgate 24 when the tailgate panel 11 is associated with it. The adhesive strip 74 of the hook 64 engages the tailgate 24 of the truck bed 16 with the hook portion 66 hooking over the side edges 72 of the tailgate panel 11. The hook portion 66 holds the tailgate panel 11 against the truck tailgate 24, yet allows the edges 72 of the tailgate panel 11 to slide on the hook 66 during the opening and closing of the tailgate 24. The edge portions 72 may be reinforced by a glide strip 83 placed along the areas of interaction between the hook 64 and the edge portion 72 as the panel 11 slides on the fastener 64 during tailgate opening and closing. Instead of an adhesive fastener connection between the liner and the tailgate, the fastener may be attached to the tailgate by a magnet. The fastener can be fixed to the liner with the magnet sliding on the tailgate during opening and closing.

FIG. 9 is an exploded perspective view of the interaction between the wheel well connector tabs 20 with the pick-up bed 16. The tabs 20 may be attached to the pick-up bed 16 wheel wells 14 by a variety of methods. Preferably, the tabs 20 are attached to the wheel wells by the adhesive hooks or clips 64 of the type shown in FIG. 10, where the adhesive layer 72 of the hook 64 is pressed against and affixed to the wheel well of the truck bed 16. A slightly different form of clip is illustrated in FIG. 9. The hook portion is securely fitted over the tabs 20, thereby providing an attachment between the truck bed 16 and the liner 1 at its tabs 20. Alternatively, Velcro strips 20 and 22 comprising an adhesive side and a Velcro side may be employed for affixing the tabs 20 to the truck bed 16. The adhesive sides of the velcro strips are attached to the tabs 20 and the wheel wells 14 and the strips are positioned so that the velcro surfaces of the strips engage each other when the tabs 20 are positioned for attachment to the wheel wells 14. The tabs 20 may be of a single layer as shown in FIG. 8, but are preferably folded to be double layered, as shown in FIG. 9.

We claim:

1. A protective liner for a truck bed comprising:
a plurality of panels;
a plurality of connectors to connect said panels together to form said liner; and
a plurality of fasteners, each of said plurality of fasteners comprising a hook portion attaching to the edge of said linear and an adhesive portion for fastening said linear to said truck bed.

2. The linear of claim 1, wherein said plurality of panels comprise a floor panel, a front panel, a tailgate panel and two side panels.

3. The apparatus of claim 2, wherein said panels fold at their periphery to provide overlapping areas of connection between said panels to form said liner.

4. The apparatus of claim 3, wherein said overlapping areas of connection are adapted to receive said plurality of connectors, said plurality of connectors comprising a two piece, male-female type connector.

5. The apparatus of claim 4, wherein said hook portion fits over an edge of said liner, and said adhesive portion is secured to said truck bed.

6. A truck bed liner, comprising:
a plurality of flat corrugated panels including a floor panel, a tailgate panel, two side panels and a front panel that corresponds respectively to a truck bed front wall, sides, floor and tailgate;
one or more fold lines located adjacent to and spaced from the periphery of one or more of said panels;
whereby folding said panels along said fold lines provide one or more areas of panel overlap with adjacent panels;
a plurality of connectors adapted to join said areas of panel overlap to unify said panels; and
a plurality of liner fasteners adapted to secure said liner to said truck bed.

7. The apparatus of claim 2, wherein said tailgate panel is freely moveable between an opened and closed position.

8. The apparatus of claim 6, wherein said liner fasteners include a hook portion to fit over a panel edge and an adhesive portion to be secured to the truck bed.

9. The apparatus of claim 8, wherein said fasteners are adaptable for use with said tailgate panel to allow slidable movement of said tailgate panel relative to said tailgate to accommodate opening and closing movement of said tailgate, with said hook portion being adapted to fit over vertical edges of said tailgate panel, and said adhesive portion being adapted to adhere to said tailgate.

10. The apparatus of claim 6, wherein said front panel, said floor panel and said tailgate panel are one piece.

11. The apparatus of claim 6, wherein said floor panel and said tailgate panel are one piece.

12. The apparatus of claim 6, wherein said floor panel, front panel and tailgate panel are one piece.

13. The apparatus of claim 8, wherein said liner comprises upper edges which fold to provide reinforcing areas of overlap of said liner upper edges.

14. The apparatus of claim 4, wherein said plurality of liner fasteners secure said liner to said truck bed, said hook portion being adapted to fit over said foldable upper edges of said unitary liner, and said adhesive portion is adapted to adhere to said truck bed.

15. The apparatus of claim 6, wherein said areas of panel overlap have a plurality of holes therethrough.

16. The apparatus of claim 15, wherein said plurality of connectors are configured to extend through said plurality of holes placed in said areas of panel overlap to secure said areas of panel overlap together.

17. The apparatus of claim 6, wherein said floor panel, front panel, tailgate panel and two side panels are compactly foldable and packagable.

18. A lightweight, compact, easy to assemble and transport liner for a pick-up truck bed comprising;
   a floor panel, a tailgate panel, two side panels, and a front panel assembled to form a unitary liner;
   a plurality of score lines located on said floor panel and side panel outer horizontal edges, said panels being foldable at said score lines to produce aligned areas of panel overlap at assembly;
   a plurality of connectors extending through said panels at said aligned areas of pan=1 overlap to unify said panels to produce said unitary liner;
   said floor panel and said side panel being foldable or cut at said score lines to adjust the length of said floor panel and said side panels as to accommodate varying truck bed sizes..
   a fold line located along said unitary liner upper edges,
   said unitary liner upper edges foldable at said fold line as to produce a double-thickness of said panels along said upper edges of said liner;
   a plurality of adhesive hooks comprising a hook portion and an adhesive portion, said hook portion fitting over and securing said double-thickness of said outer edges of said unitary liner, and said adhesive portion secured to said truck bed to attach said unitary liner to said truck bed..
   said hooks including an adhesive portion to be secured to said tailgate panel, and said hook portion fitted over said tailgate panel vertical edges, slidably securing said tailgate panel to said tail during tailgate opening and closing.

19. The protective liner for a truck bed of claim 1 wherein said plurality of panels comprise a floor panel and a tailgate panel that are one piece, said hook portion of each fastener adapted to fit over the vertical edges of said tailgate panel, and said adhesive portion adapted to adhere to said tailgate, whereby said hook portion of each fastener allows slidable movement of said tailgate panel relative to said tailgate to accommodate opening and closing movement of said tailgate.

20. A protective liner for a truck bed, comprising:
   a floor panel and a tailgate panel that are one piece; and
   a plurality of fasteners, each of said plurality of fasteners comprising a hook portion adapted to fit over the edges of said floor panel and tailgate panel, and an adhesive portion adapted to adhere to said tailgate, the hook portion fitting over the edges of said tailgate panel adapted to allow slidable movement of said tailgate panel relative to said tailgate to accommodate opening and closing movement of said tailgate.

* * * * *

UNITED STATES PATENT AND TRADEMARK OFFICE
CERTIFICATE OF CORRECTION

PATENT NO. : 4,986,590
DATED : January 22, 1991
INVENTOR(S) : Anthony G. Patti, et al.

It is certified that error appears in the above-identified patent and that said Letters Patent is hereby corrected as shown below:

Column 6, line 7 delete "linear" and insert --liner--.

Column 6, line 6 delete ,"linear" and insert --liner--.

Column 6, line 5 delete "linear" and insert --liner--.

Column 7, line 14 delete "pan=l" and insert --panel--.

Signed and Sealed this

Second Day of June, 1992

*Attest:*

DOUGLAS B. COMER

*Attesting Officer*     *Acting Commissioner of Patents and Trademarks*